June 12, 1923.
P. J. BOYLE
BEET HARVESTER
Filed March 3, 1921
1,458,615
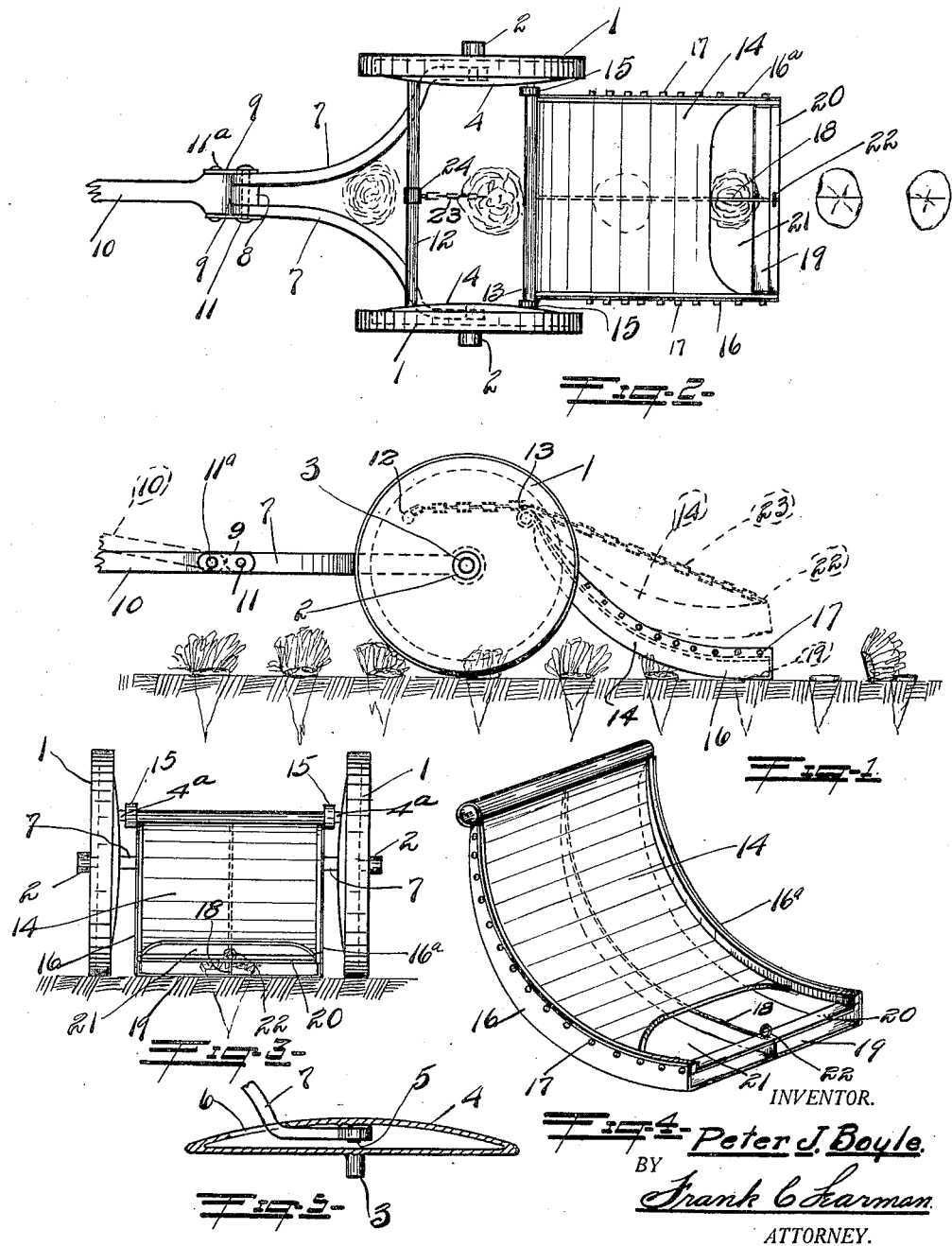
INVENTOR.
Peter J. Boyle.
BY Frank C. Farman.
ATTORNEY.

Patented June 12, 1923.

1,458,615

UNITED STATES PATENT OFFICE.

PETER J. BOYLE, OF SAGINAW, MICHIGAN.

BEET HARVESTER.

Application filed March 3, 1921. Serial No. 449,399.

*To all whom it may concern:*

Be it known that I, PETER J. BOYLE, a citizen of the United States of America, residing at Saginaw, in the county of Saginaw and State of Michigan, have invented certain new and useful Improvements in Beet Harvesters, of which the following is a specification.

This invention relates to a beet topper to be used in harvesting sugar beets and the like.

One object of the invention is to provide a beet topper of simple and durable construction which will remove the tops or crown from the beets as it is drawn along the row.

A further object is to provide a beet topper which is self regulating, that is, one which will satisfactorily remove the tops from large or small beets, regardless of whether the tops of the beets project a considerable distance from the ground, or are flush therewith, or whether the foliage be green and dense, or sparse and dry.

A further object still is to design a beet topper which can be attached in front of the usual beet digger, which is used for loosening the beets in the ground, and which will require but a small amount of power to operate.

With the above and other objects in view, the present invention consists in the novel features of construction, and arrangement of the different parts, hereinafter more fully described and particularly pointed out in the appended claims, reference being had to the drawing in which like reference characters refer to like parts throughout the several views thereof.

In the drawing:

Fig. 1 is a side elevation of my improved beet harvester.

Fig. 2 is a top plan view thereof.

Fig. 3 is a rear view of the beet topper.

Fig. 4 is an isometric view of the topping plate and knives, and

Fig. 5 is a sectional view of the stationary disks.

Referring now particularly to the drawing, the beet topper comprises a pair of ground engaging wheels 1 having the usual hubs 2 adapted to be mounted on the laterally projecting hub portion 3 of a disk 4. These disks are hollow, one surface being flat and the other being convex. Another laterally projecting hub member 5 is formed on the inner surface of this convexed portion, an opening 6 being provided to allow the draft members 7 to be inserted therein and fitted over the hub portion 5, said draft members being bent inwardly towards each other, the ends thereof converging and being spaced from each other by means of the block separator 8. Clamps 9 are secured to each side of these members 7 and a tongue 10 is pivotally connected thereto by means of the bolts 11 and 11$^a$ which secure the plates to the respective members and form a joint to allow the tongue or draw bar to rise or lower as clearly shown in dotted lines in Fig. 1. Any suitable connection may be applied to the free end of the tongue for attachment to the source of power and it will be obvious that it is impossible to disconnect the draft bars from the hubs 3 without first disconnecting the bars at the opposite ends.

For further spacing the wheels from each other and strengthening the frame, which is composed of the disks 4 and the draft bars 7, spacers or separators 12 and 13 are provided fitting over suitable laterally projecting hubs 4$^a$ formed integral with the disks.

A curved topping plate 14 is pivotally attached to the spacer rod 13, collars 15 being provided at each end thereof to prevent lateral movement of the topping plate on the rod. This topping plate is curved as shown and is provided with the knives 16 and 16$^a$ secured to the upturned edge or rib of the plate by means of stud screws 17 or the like, a similar knife 18 being secured to the center of the plate in any approved manner, all of these knives tapering in height towards the top of the plate, the bottom edge being sharp and the rear end of the two outside knives being flattened to form runners to prevent the rear end of the plate sinking into the ground. These three longitudinally disposed knives I term the gage knives which determine the height at which the beet is to be topped, the plate being of sufficient weight to crush and smash the leaves, the knives cutting through and slightly into the solid portion of the beet, and the horizontally disposed topping knife 19 severing the tops from the beets. This topping knife 19 can be secured to the sides of the plate or knives in any satisfactory manner, a transversely disposed brace 20 being added for strengthening the plate at its rear end. The plate is also cut away as shown at 21 to allow leaves and other foreign matter to escape from the plate and prevent an accumulation thereof from raising the plate from the ground.

The upper end of the plate is curved as shown to facilitate its attachment to the rod 13 and it will be apparent that said plate is free to rise and lower, but is prevented from lateral movement, and while but three gage knives are shown in the present instance, it will be understood that any desired number may be employed. Particular attention is also directed to the fact that each beet is independently gaged and topped as the curve of the plate and the taper of the knives prevent the engagement of more than one beet at a time.

For raising the plate from the ground when the machine is transported from each location to another I have provided a link 22 which is anchored to the rear of the plate, a chain member 23 being secured to the member 24 solid on the brace extending over and being attached to the said plate to hold it in any desired position.

From the foregoing description it will be obvious that I have perfected a practical and inexpensive topper, which will automatically gage and remove the tops from beets or other vegetables.

What I claim is:

1. A beet harvester comprising, in combination, a pair of spaced apart disks, ground engaging wheels revolubly mounted on said disks, rods for rigidly connecting the said disks in spaced relation, and a topping plate hingedly secured to one of said rods.

2. A beet harvester comprising, in combination, a pair of spaced apart hollow disks, ground engaging wheels revolubly mounted thereon, and draft means detachably secured thereto, rods for holding the said disks in spaced relation, and a curved topping plate hingedly secured to one of said rods.

3. A beet harvester comprising, in combination, spaced apart hollow disks having laterally extending hubs integral therewith, ground engaging wheels mounted on the said hubs, and means on the interior of the hub or attaching the draft means thereto, rods connecting said disks, and a curved topping plate hingedly secured to one of said rods, and flexible means for holding said plate in raised position.

4. A beet harvester comprising, in combination, spaced apart hollow disks having laterally extending hubs integral therewith, ground engaging wheels mounted on said hubs, other hubs on the interior of the disks for pivotally attaching the draft means thereto, rods connecting said disks, a curved topping plate swingingly secured thereto, and a flexible connection anchored to the other rod and adapted to detachably engage the rear of the said plate for raising it clear of the ground.

In testimony whereof, I affix my signature.

PETER J. BOYLE.